(12) United States Patent
Can et al.

(10) Patent No.: US 10,036,820 B2
(45) Date of Patent: Jul. 31, 2018

(54) EXPERT GUIDED KNOWLEDGE ACQUISITION SYSTEM FOR ANALYZING SEISMIC DATA

(71) Applicants: General Electric Company, Schenectady, NY (US); EXXONMOBIL UPSTREAM RESEARCH COMPANY, Houston, TX (US)

(72) Inventors: Ali Can, Niskayuna, NY (US); Erhan Bas, Ashburn, VA (US); Dongrui Wu, Clifton Park, NY (US); Jie Yu, Santa Clara, CA (US); Leslie Wahrmund, Kingwood, TX (US)

(73) Assignees: GENERAL ELECTRIC COMPANY, Schenectady, NY (US); EXXONMOBIL UPSTREAM RESEARCH COMPANY, Houston, TX (US)

( * ) Notice: Subject to any disclaimer, the term of this patent is extended or adjusted under 35 U.S.C. 154(b) by 148 days.

(21) Appl. No.: 15/061,800

(22) Filed: Mar. 4, 2016

(65) Prior Publication Data
US 2017/0254910 A1 Sep. 7, 2017

(51) Int. Cl.
*G01V 1/30* (2006.01)

(52) U.S. Cl.
CPC .............. *G01V 1/302* (2013.01); *G01V 1/301* (2013.01); *G01V 2210/64* (2013.01); *G01V 2210/641* (2013.01)

(58) Field of Classification Search
CPC ........ G01V 1/301; G01V 1/302; G01V 1/288; G01V 1/345; G01V 2210/64; G01V 2210/641

See application file for complete search history.

(56) References Cited

U.S. PATENT DOCUMENTS 6,463,387 B1  10/2002  Runnestrand et al.
6,823,266 B2  11/2004  Czernuszenko et al.
(Continued)

FOREIGN PATENT DOCUMENTS

WO    2012090001 A1    7/2012

OTHER PUBLICATIONS

Borgos, Hilde G., et al.; "Automated Structural Interpretation Through Classification of Seismic Horizons", Mathematical Methods and Modelling in Hydrocarbon Exploration and Production, Jan. 1, 2005, pp. 89-106.

(Continued)

*Primary Examiner* — Ian J Lobo
(74) *Attorney, Agent, or Firm* — Fletcher Yoder, P.C.

(57) ABSTRACT

A method includes retrieving a seismic data set, receiving training data that includes one or more seed points of an identified geobody, determining a geobody trajectory of the identified geobody, based on the one or more seed points of the identified geobody, displaying the geobody trajectory, receiving inputs expanding the geobody trajectory, shrinking the geobody trajectory, confirming the geobody trajectory, or a combination thereof, training a classification algorithm using the geobody trajectory, running the classification algorithm on the seismic data set, receiving an output of one or more sets of voxels from the classification algorithm, skeletonizing the one or more sets of voxels to present the one or more sets of voxels as a set of possible geobody trajectories, and retraining the classification algorithm based on feedback received from a reviewer.

20 Claims, 11 Drawing Sheets

(56) References Cited

U.S. PATENT DOCUMENTS

| | | |
|---|---|---|
| 6,989,841 B2 | 1/2006 | Docherty |
| 7,024,021 B2 | 4/2006 | Dunn et al. |
| 8,364,442 B2 | 1/2013 | Skripkin |
| 2003/0112704 A1* | 6/2003 | Goff .................. G01V 1/30 367/72 |
| 2004/0091143 A1* | 5/2004 | Hu .................... G06T 7/13 382/154 |
| 2010/0171740 A1 | 7/2010 | Andersen et al. |
| 2010/0232651 A1 | 9/2010 | Keskes et al. |
| 2011/0048731 A1 | 3/2011 | Imhof et al. |
| 2011/0115787 A1 | 5/2011 | Kadlec |
| 2011/0247829 A1 | 10/2011 | Dobin et al. |
| 2012/0257796 A1 | 10/2012 | Henderson et al. |
| 2013/0064040 A1 | 3/2013 | Imhof et al. |
| 2013/0107003 A1* | 5/2013 | Lim .................. G06L 13/40 348/46 |
| 2013/0151161 A1 | 6/2013 | Imhof et al. |
| 2013/0294197 A1 | 11/2013 | Thachaparambil et al. |
| 2014/0188769 A1 | 7/2014 | Lim et al. |

OTHER PUBLICATIONS

Mackey et al., "Improved Automated Seismic Event Extraction Using Machine Learning", American Geophysical Union, Fall Meeting 2009, Dec. 2009.

Jung et al., "Carbonate Geobodies: Hierarchical Classification and Database—A New Norkflow for 3D Reservoir Modelling", Journal of Petroleum Geology, Wiley Online Library, Jan. 2012, pp. 49-65, vol. 35, Issue 1.

Paton, G., et al., "Adaptive geobodies: Delineation of complex and heterogeneous stratigraphic features," SEG Technical Program Expanded Abstracts, Society of Exploration Geophysicists, pp. 4384-4387 (2011) (Abstract).

Repin, D.G., et al., "Interactive three-dimensional visualization of seismic array data," Computers & Geosciences, vol. 23, Issue. 10, pp. 1079-1092 (Dec. 10, 1997) (Abstract).

* cited by examiner

EXPERT GUIDED KNOWLEDGE ACQUISITION SYSTEM FOR ANALYZING SEISMIC DATA

BACKGROUND

The subject matter disclosed herein relates to the analysis of seismic data, such as to identify features of interest.

Seismic data is collected and used for evaluating underground structures and features that might otherwise not be discernible. Such seismic data may be useful in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is in the interpretation and analysis of the large three-dimensional data sets that can be generated in a seismic survey project. In particular, analysis of such data sets may be tedious and time-consuming, potentially requiring months of manual work to analyze. Accordingly, it would be beneficial to reduce the amount of time required to a geologist to review and analyze a seismic data set.

BRIEF DESCRIPTION

Certain embodiments commensurate in scope with the original claims are summarized below. These embodiments are not intended to limit the scope of the claims, but rather these embodiments are intended only to provide a brief summary of possible forms of the claims. Indeed, the claims may encompass a variety of forms that may be similar to or different from the embodiments set forth below.

In one embodiment, a method includes retrieving a seismic data set, receiving training data that includes one or more seed points of an identified geobody, determining a geobody trajectory of the identified geobody, based on the one or more seed points of the identified geobody, displaying the geobody trajectory, receiving inputs expanding the geobody trajectory, shrinking the geobody trajectory, confirming the geobody trajectory, or a combination thereof, training a classification algorithm using the geobody trajectory, running the classification algorithm on the seismic data set, receiving an output of one or more sets of voxels from the classification algorithm, skeletonizing the one or more sets of voxels to present the one or more sets of voxels as a set of possible geobody trajectories, and retraining the classification algorithm based on feedback received from a reviewer.

In a second embodiment, a system includes seismic data analysis system includes a processor, and a display configured to display graphical representations of a seismic data set. The seismic data analysis system is configured to receive training data that includes one or more seed points of an identified geobody, determine a trajectory of the identified geobody, display the trajectory, receive inputs expanding the trajectory, shrinking the trajectory, confirming the trajectory, or a combination thereof, train a classification algorithm based upon the trajectory, run the classification algorithm on the seismic data set to identify one or more possible geobody trajectories within the seismic data set, and retrain the classification algorithm based on feedback received from a reviewer.

In a third embodiment, a non-transitory computer readable medium comprising executable instructions that when executed cause a processor to retrieve a seismic data set, receive training data that includes one or more seed points of an identified geobody, determine a trajectory of the identified geobody, display the trajectory, receive inputs expanding the trajectory, shrinking the trajectory, confirming the trajectory, or a combination thereof, train a classification algorithm based upon the trajectory, run the classification algorithm on the seismic data set to identify one or more possible geobodies within the seismic data set, skeletonize the one or more possible geobodies to extract one or more possible geobody trajectories, rank the one or more possible geobody trajectories based on confidence, display the one or more possible geobody trajectories in order of rank, and retrain the classification algorithm based on feedback received from a reviewer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Seismic data may be used to analyze and detect subsurface features. For example, identification of geobodies (e.g., channels, pinchouts, progrades, gas chimneys, and so forth) from a three-dimensional (3D) seismic survey may be performed as part of prospecting for hydrocarbons (e.g., oil, natural gas, and so forth). As generally used herein, a geobody is a feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time consuming and imprecise task of interpreting the 3D volumes generated from the acquired seismic data. For example, a single seismic volume may require months of manual work to analyze. As discussed herein, automated methods may make such time consuming work more feasible for a reviewer to interpret. However, automated interpretation of a 3D volume generated from seismic images may be difficult to achieve because the shape and other characteristics of geobodies vary tremendously from location to location.

With this in mind, and as discussed herein, the present approach uses training data from an expert user (e.g., geologist) identifying features in a small subset of the seismic data, using the data to train an algorithm, running the trained algorithm on the remainder of the seismic data set, returning to the user periodically for feedback, retraining the algorithm, and so on until all of the possible geobodies of interest have been returned to the user.

Figure 1:
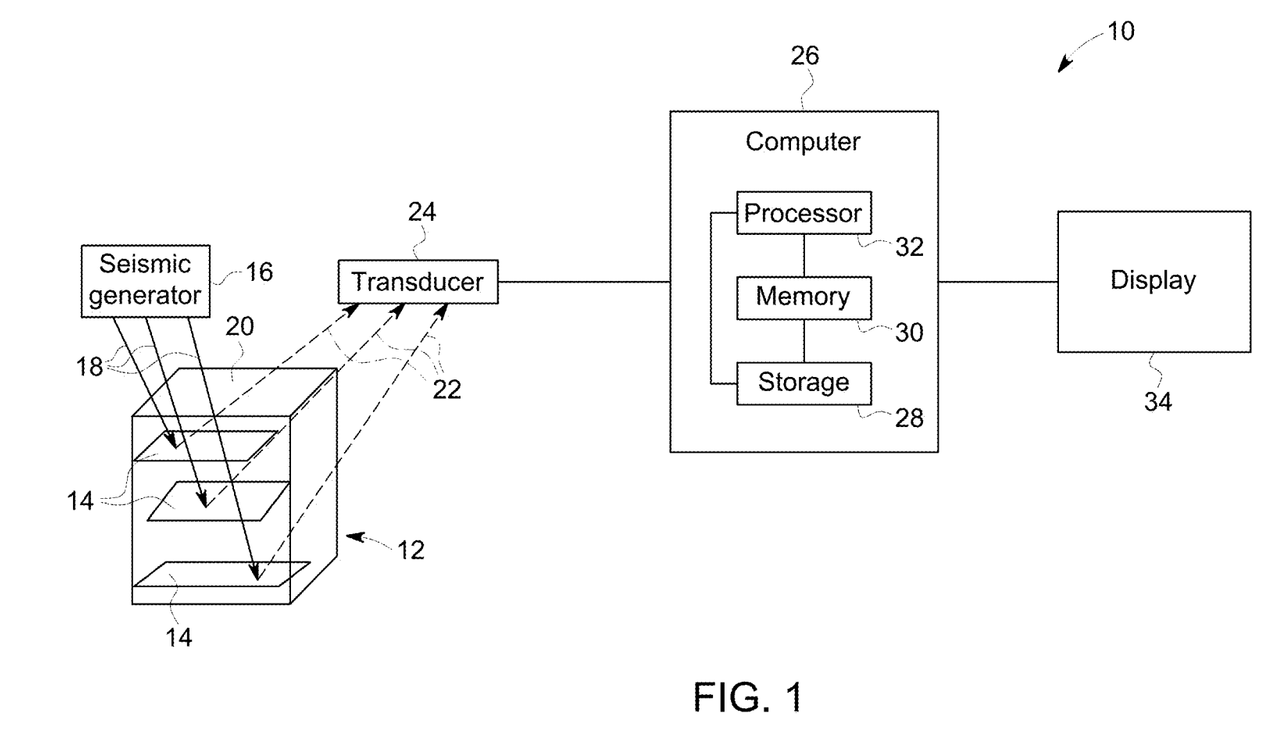
FIG. 1 shows a schematic of a seismic surveying system in accordance with aspects of the present disclosure.

With the foregoing discussion in mind, the present approach may be utilized in conjunction with a 3D seismic data set generated using any suitable seismic surveying system. Turning to FIG. 1, a high-level overview of one such seismic surveying system 10 is provided by way of example. In the depicted example, a subsurface volume 12 is probed by the seismic surveying system 10. The subsurface volume 12 may typically include various layers or strata 14 at different depths and orientations within the volume 12. These various strata 14 define respective boundaries and transitions within the volume which may act to reflect waves (e.g., seismic or acoustic waves) propagating through the subsurface volume 12. Likewise, other features or geobodies within the subsurface volume (e.g., channels, pinchouts, progrades, gas chimneys, and so forth) may also include surfaces, transitions, or boundaries that act to reflect acoustic or seismic waves.

In the depicted example, a seismic generator 16 of some form (such as one or more controlled detonations, an air gun or cannon, or another suitable source of seismic waves) is part of the seismic surveying system 10. The seismic generator 16 can typically be moved to different positions on the surface of the volume 12 and can be used to generate seismic waves 18 at different positions on the surface 20 that penetrate the subsurface volume 12 under investigation. The various boundaries or transitions within the subsurface 12 (either associated with the various layers or strata 14 or with more complex geobodies) cause the reflection 22 of some number of the seismic waves 18. One or more transducers 24 at the surface 20 may be used to detect the waves 18 reflected by the internal structures of the subsurface volume 12 and to generate responsive signals (i.e., electrical or data signals).

These signals, when reconstructed, represent the internal boundaries and features of the subsurface volume 12. For example, in the depicted embodiment, the signals are provided to one or more computers 26 or other suitable processor-based devices that may be used to process the signals and reconstruct a volume depicting the internal features of the subsurface volume 12. In one embodiment, the computer 26 may be a processor-based system having a non-volatile storage 28 (such as a magnetic or solid state hard drive or an optical media) suitable for storing the data or signals generated by the transducer 24 as well as one or more processor-executable routines or algorithms, as discussed herein, suitable for processing the generated data or signals in accordance with the present approaches. In addition, the computer 26 may include a volatile memory component 30 suitable for storing data and signals as well as processor-executable routines or algorithms prior to handling by the processor 32. The processor 32 may, in turn, generate new data (such as a volumetric representation of the subsurface volume 12 and/or a set of features of interest for further analysis) upon executing the stored algorithms in accordance with the present approaches. The data or reconstructions generated by the processor 32 may be stored in the memory 30 or the storage device 28 or may be displayed for review, such as on an attached display 34.

Figure 2:
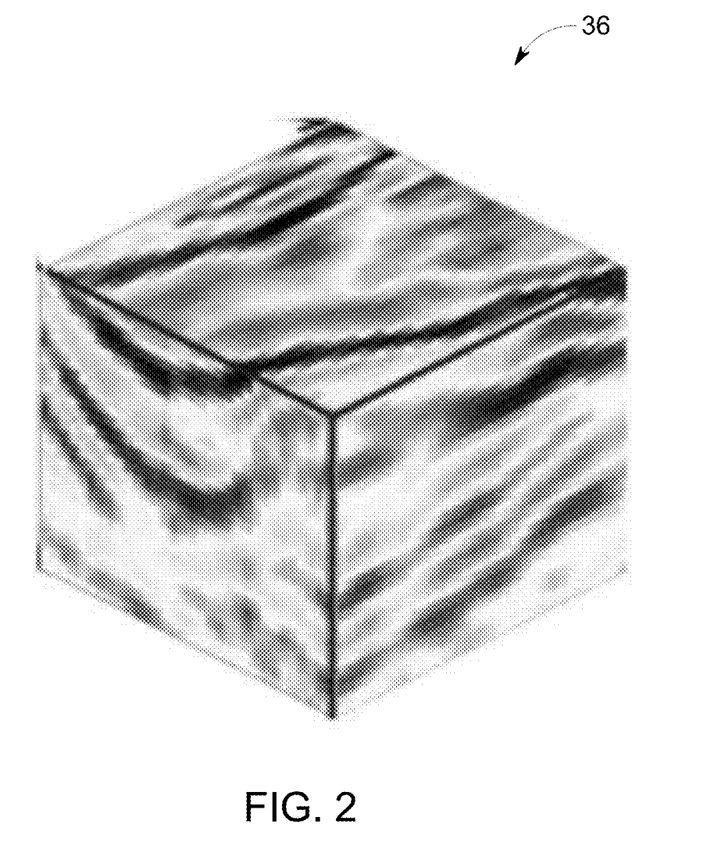
FIG. 2 shows a reconstruction of 3D seismic data in accordance with aspects of the present disclosure.

Turning to FIG. 2, a representation of a reconstruction 36 of 3D seismic data of a portion of a subsurface volume 12 is depicted. As depicted in FIG. 2, such a reconstruction 36 may depict features of the subsurface volume 12, such as various strata, layers, and geobodies 36, which due to geological processes and time scales, may be at various orientations relative to one another.

As will be appreciated, manual inspection of large amounts of such reconstructed data may be challenging and time-consuming. As previously discussed, a seismic data set may take a geologist months to analyze and existing automated systems may be unreliable because of the variance in geobody shapes and characteristics from location to location around the globe. Accordingly, the disclosed expert guided knowledge acquisition (EGKA) system uses input from the expert user (e.g., geologist) to iteratively train an algorithm to identify geobodies within the seismic data set. The EGKA parses the seismic data using the trained algorithm, identifies possible geobodies, ranks them in descending order or confidence, presents them to the user for validation, and retrains the algorithm accordingly. The user interacts with the EGKA through a user interface called the interactive geobody tracking, editing, and visualization (IGTEV) tool. The user may utilize the EGKA via the computer 26 and display 34 shown in FIG. 1, or via another computer.

Figure 3:
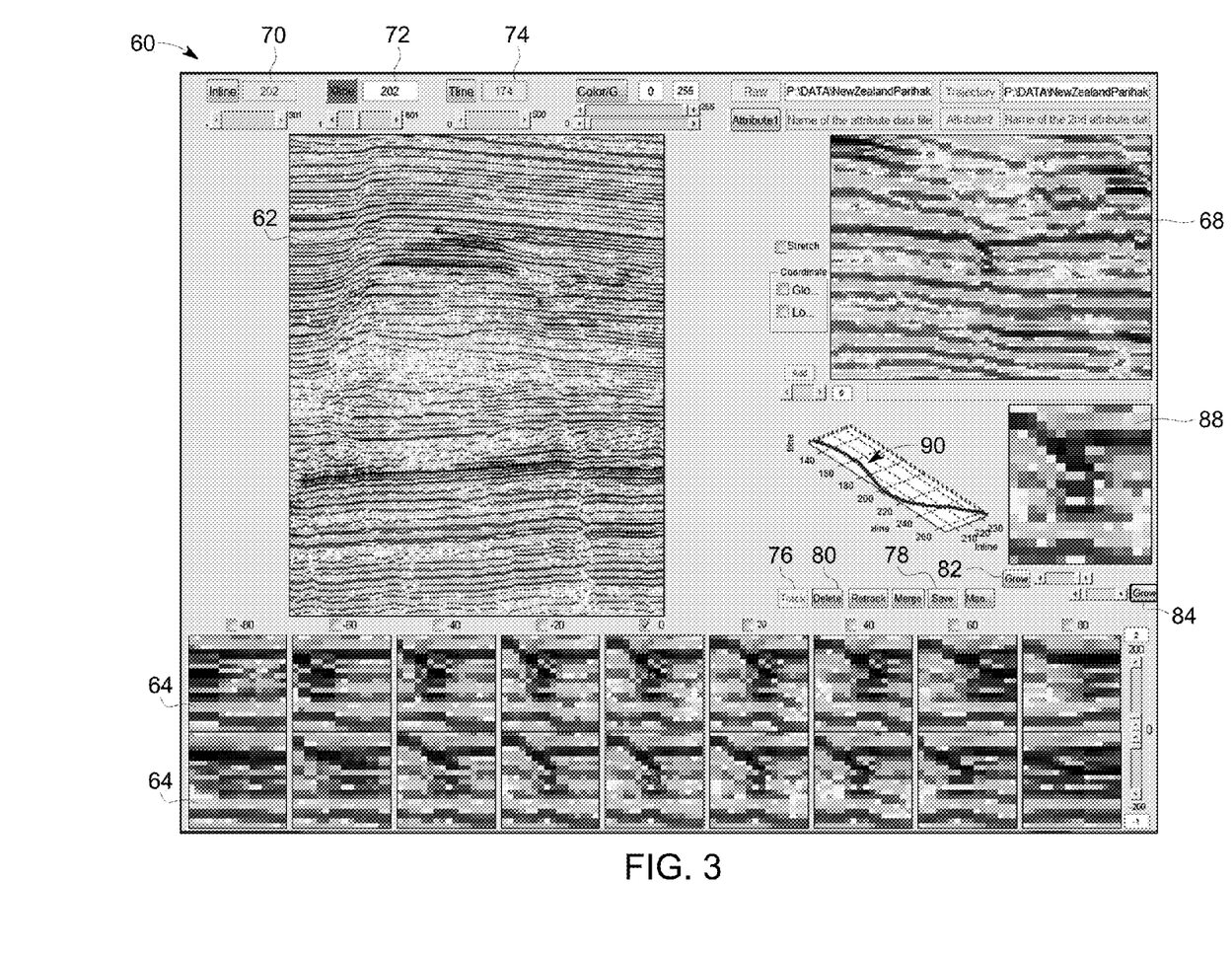
FIG. 3 is a sample screenshot of the interactive tracking, editing, and visualization (IGTEV) tool in accordance with aspects of the present disclosure.

FIG. 3 shows a sample screenshot of an example of an IGTEV tool interface used by the user (e.g., geologist) to analyze the seismic data. As shown, the IGTEV interface may include a 3D seismic data viewer 62, a "seed point search and direction initiator" 64 (the 18 small windows across the bottom of the screenshot 60), a trajectory fly-through viewer 66, and a detail viewer 68. The IGTEV may also display the n-line (e.g., inline) 70, and x-line (e.g., cross-line) 72, and the t-line (e.g., time line, mapview) 74 values. The IGTEV may also include track 76, save 78, and delete 80 buttons, as well as a "grow forward" slider 82, and a "grow backward" slider 84. The expert uses the IGTEV to identify two points along the trajectory of a geobody, or a seed point and a search direction, to initialize the EGKA system, as opposed to identifying many points along the trajectory. The tracking algorithm of the EGKA then automatically identifies a possible trajectory through the points identified by the user. The user may then edit the trajectory using the IGTEV interface to and make it more accurate. This process may be repeated a number of times to train the EGKA.

The user opens or loads a data set by identifying the file and then clicking on the open button 86. The data may be in .mat, .mhd, .segy, or any other suitable format. A slice of the data appears in the 3D seismic data viewer 62, which enables the user to view a region in multiple directions. The user may switch between n-line, x-line, and t-line by clicking on the respective buttons 70, 72, 74. The selected n-line, x-line, or t-line button 70, 72, 74 may be illuminated a different color, or otherwise visually differentiated. Additionally, the n-line, x-line, and t-line values may be displayed in the edit boxes next to the buttons 70, 72, 74. From the 3D seismic data viewer 62, the user may explore the data and select a point of interest belonging to a specific geobody 36. The user may click on the 3D seismic data viewer 62 (the main window) to select a different point of interest. The detail viewer 68, which displays a detailed, zoomed-in view of the selected point of interest is automatically updated. The user may also click in the detail viewer 68 and then use the scroll wheel of the mouse to zoom in and out. Cross sections passing through the point of interest at different angles are displayed in the seed point search and direction initiator 64. The user may use the seed point and search direction initiator to initialize the seed point and the initial search direction for the geobody 36. The seed point and the initial search direction for the geobody 36 displays eighteen windows in nine columns and two rows. Each column corresponds to a search direction. After selecting a seed point, the user selects the most plausible of the multiple (e.g., nine) search directions by checking one of the check boxes above each column of windows in the seed point search and direction initiator 64, and clicking in each of the two windows to identify two reference points. The image in the bottom row will be the seed point and the image in the top row will determine the initial search direction based on the reference points.

When the user clicks the track button 76, the geobody 36 tracking algorithm, using the initial seed point identified by the user and the search direction toward the second point, automatically tracks the region of interest and displays it in the trajectory fly-through viewer 66. The tracking algorithm tracks both forward and backward from the initial seed point. It should be understood that the geobody 36 tracking algorithm, in one embodiment, is based on an image registration engine, so it is non-parametric. Thus, the tracker is capable of tracking a rich class of geobodies 36 (e.g., channels, progrades, onlaps, downlaps, toplaps, pinchouts, faults, terminations, etc., and their subcategories). The tracking algorithm determines search regions, identifies the best matching region within the search region, and iteratively tracks the geobody 36.

Once the geobody 36 tracker returns a trajectory to the user, the user may utilize the trajectory fly-through viewer 66 to grow or crop a trajectory produced by the geobody 36 tracking algorithm. As shown in FIG. 3, the trajectory fly-through viewer 66 may include a window showing a perspective view 90 of a curve through the trajectory and a window showing an image of the seismic data at a one point, in a given direction. In some cases, the tracking algorithm may underestimate or overestimate the trajectory. If the tracker underestimates the trajectory, the user can use the grow forward slider 82 to expand the trajectory. In this case, the tracker is restarted using the last point from the returned trajectory as the seed point and the last unit vector as the search direction. If the tracker overestimates the trajectory, the user can use the grow backward slider 84 to crop the trajectory. In this case, the user identifies the end point (e.g., using the grow backward slider 84), and the tracker crops the trajectory to remove anything beyond the end point. The process of the geobody 36 tracker identifying trajectories and returning them to the user to evaluate is referred to as training.

Figure 4:
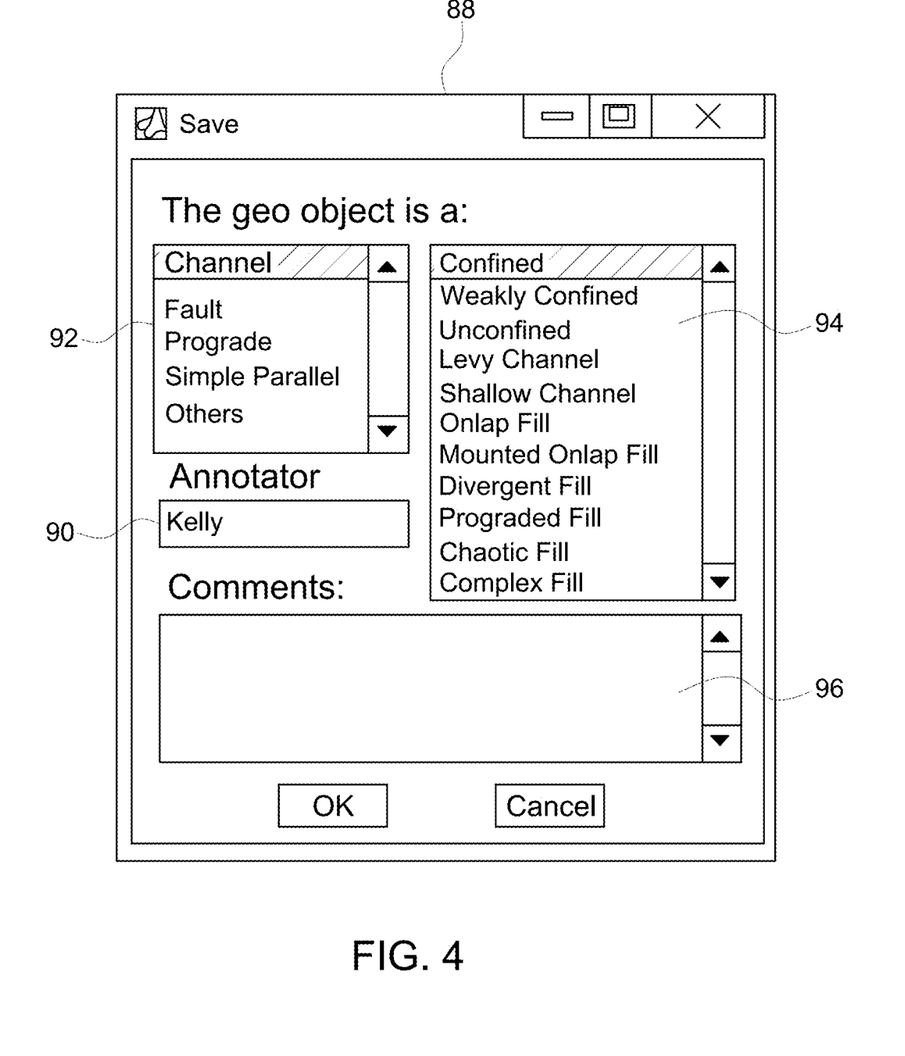
FIG. 4 shows a pop up window that prompts the user to enter information before saving a trajectory in accordance with aspects of the present disclosure.

Once the user is happy with the trajectory, the user clicks on the save button 78. A popup window (shown in FIG. 4) prompts the user to input more information. If the user is dissatisfied with the trajectory, the user clicks on the delete button 80 and the trajectory is deleted. As shown in FIG. 4, the pop up window 88 prompts the user to input additional information about the trajectory after the user clicks on the save button 78. The pop up window 88 (or comparable interface feature) may have a field for the user's name 90, the geobody 36 type 92 (e.g., channel, fault, prograde, onlap, downlap, toplap, pinchout, etc.), geobody characteristics 94 or secondary geobody type (e.g., confined, weakly confined, unconfined, levy channel, shallow channel, onlap fill, mounded onlap fill, divergent fill, prograded fill, chaotic fill, complex fill, etc.), geobody character, and any additional comments 96.

In some embodiments, the IGTEV may include a revisiting capability. That is, the user may be able to open and edit previously saved trajectory files. For example, a user may want to edit a trajectory file that was created by the user, one of the user's colleagues, or by the machine learning algorithm. The revisiting capability may allow a user to add, delete, grow, shrink, or relabel trajectories.

Once the geobody 36 tracker and the user have gone through enough training examples, the training examples may be used by the incremental supervised learning module to tune a supervised classification algorithm. The incremental supervised learning module may have a number of specific features, including descriptor extraction, visual vocabulary building, quantization, classification, and incremental updating.

Figure 5:
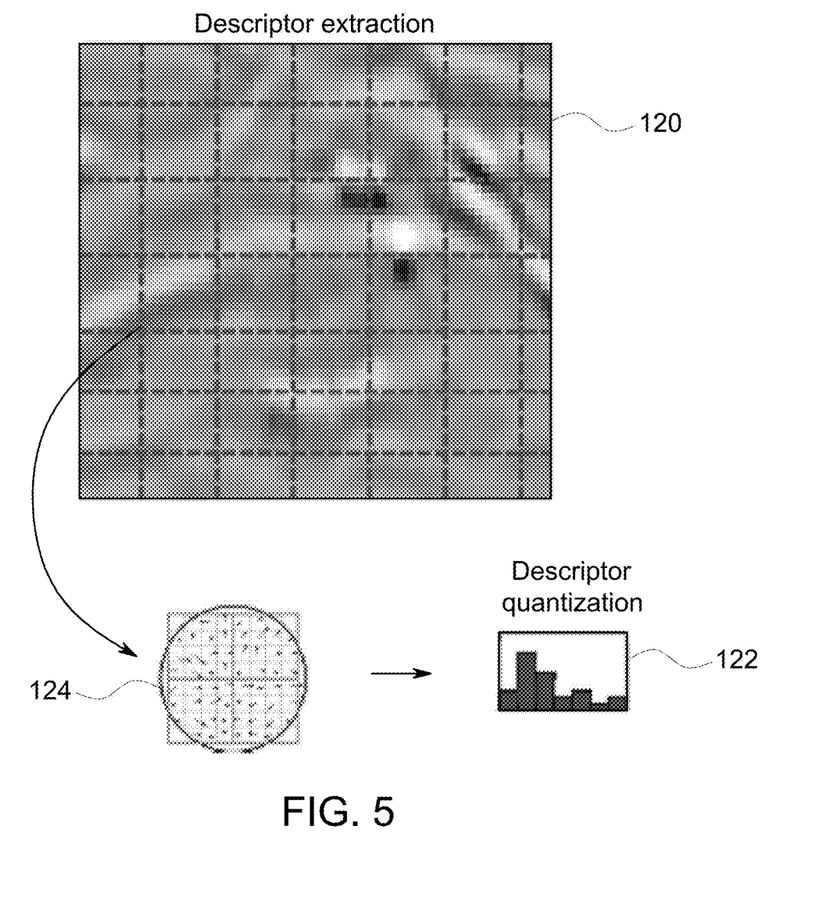
FIG. 5 is an image of descriptor extraction in accordance with aspects of the present disclosure.

FIG. 5 shows an embodiment of descriptor extraction. Seismic imagery of geobodies (e.g., channels, simple parallels, etc.) may carry distinct visual patterns. The incremental supervising learning module may be able to extract descriptors that capture these distinct visual patterns to represent the data. For example, a scale invariant feature may calculate the local gradient histograms 122 around a scale invariant key point in a 2D image. For seismic data, key point detection may be unreliable because of low contrast and/or low resolution. Therefore, dense sampling may be used to calculate local gradient descriptors. FIG. 5 illustrates the process of extracting local gradient descriptors using a densely sampled grid 124. Other visual descriptors such as shape context, concurrence matrix and local binary pattern may be used in our framework to describe shape and texture features.

The incremental supervised learning module may also build visual vocabulary and perform quantization. Raw descriptors may have very high dimensionality, which may be difficult to handle in the subsequent learning tasks. Visual vocabulary, or codebook, is one way to map the descriptors to a low dimensional space. The incremental supervised learning module may apply K-means, spectral clustering, or other clustering methods to descriptors to calculate visual words in order to build the codebook. Then, the incremental supervised learning module applies nearest neighbor, sparse coding, or other quantization methods, to map the raw descriptor to one visual word or a weighted combination of multiple visual words. Because the number of visual words is often much less than the dimensionality of the raw descriptors, the mapping coefficients of the descriptors can be used as their low dimensional representation. For descriptors extracted from the same region of interest, their mapping coefficients can be combined into the histogram 122. Spatial relationships between the descriptors in the same region of interest can also be incorporated into the histogram using methods such as spatial pyramid. Descriptor extraction, vocabulary building, and quantization can be performed on training and testing seismic data offline in order to reduce computational cost.

As previously discussed, the incremental supervising learning module may include a supervised classification algorithm. User inputs obtained via the IGTEV and historical data associate training trajectories with certain types of geobodies 36. The supervised classification algorithm may obtain a training data set by cropping multiple regions of interest from the trajectories and constructing descriptor histograms 122. Similarly, the supervised classification algorithm may obtain test data by sequentially cropping overlapping regions of interest from the test seismic imagery 120. To ensure scale invariance, the size of test regions of interest can be set at multiple levels. The supervised classification algorithm may use supervised learning techniques (e.g., support vector machine, decision tree, etc.) to model the relationship between descriptor histograms 122 and the geobody 36 of interest. The supervised classification algorithm may then apply trained classifiers to the test regions of interest in the same seismic volume to produce confidence rated predictions on the geobody 36 types. Because of limited user input, a single classifier often has a low prediction accuracy. Accordingly, using multiple classifiers trained by different methods may alleviate this problem by combining their predictions on the same region of interest.

Figure 6A:
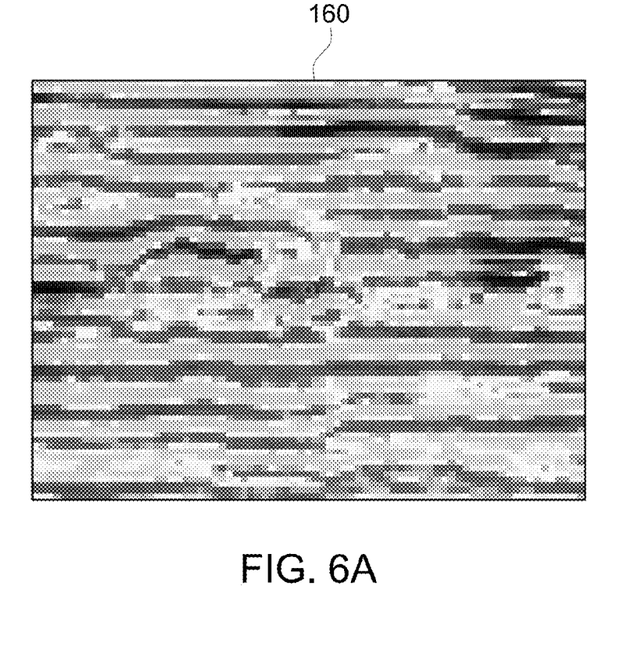
FIG. 6A is a raw seismic data image in accordance with aspects of the present disclosure.
Figure 6B:
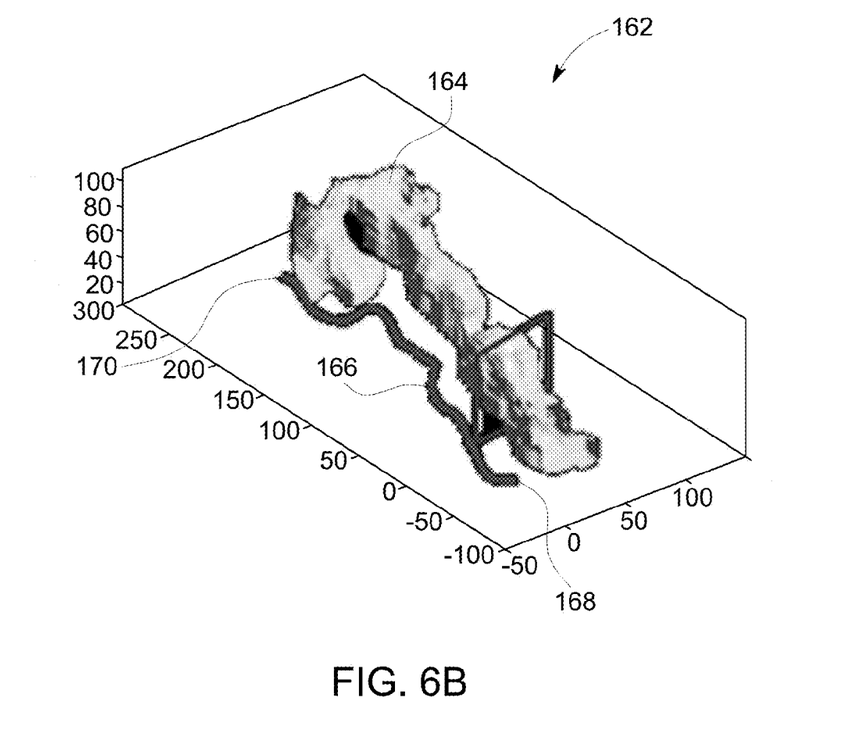
FIG. 6B is the output of the skeletonization module in accordance with aspects of the present disclosure.

In one embodiment, a skeletonization module (discussed in more detail with regard to FIG. 6) converts the final predictions of the test regions of interest into trajectories, which are presented to the user via the IGTEV tool. The IGTEV tool allows users to edit the predicted trajectories to provide feedback to the incremental supervised learning module. New user inputs can be added to the training samples to re-train the classifiers. Because these new user inputs are from an expert, it is reasonable to assume that the new inputs are more valuable to the trained model than the inputs generated by the classification algorithm. As such, more weight may be assigned to the user feedback using reinforcement learning methods (e.g., interactive boosting). Incremental learning algorithms may be used to speed up the model update based on the existing classifier and the feedback inputs from user.

FIGS. 6A and 6B show the raw seismic data image 160 and the product 162 of the skeletonization module. FIG. 6A shows a raw image 160 from the seismic data (e.g., what the user would see in the 3D seismic data viewer 62 of the IGTEV). FIG. 6B shows an image 162 of the skeletonized volume 164.

Skeletonization of data from 3D seismic images helps the user to interpret and visualize the volume 164. In general, geobodies 36 (e.g., channel systems) have curvilinear structures that can be represented with one dimensional curves 166 in three dimensional space. The skeletonization module generates a ridge function 166 following the center of the volume 164 that represents the channel system, and then finds the end points 168, 170 of the volume 164 and the geodesic 166 that connects these end points 168, 170 to one another.

In order to generate a ridge function 166 that has high values at the centerline of the volume 164 and decays radially as one deviates from this centerline orthogonally, the skeletonization module uses a distance transform. The distance transform assigns a Euclidean distance between a voxel, x, and the nearest boundary voxel to the value at x. This results in a ridge function, $R(x)$, that has high values at the center locations where the distance is maximal compared to other voxel locations. Once the skeletonization module calculates the distance transform, it finds the tip voxels of the 3D volume in order to extract the centerline. Because the channel systems of interests are built over thousands of years, self-intersections or discontinuities are unlikely unless the volume was shifted by faults. As such, the skeletonization module estimates the principal axis of the geobody 36 in 3D and finds the projection of the voxel locations on to this principal axis. The skeletonization module then uses the furthest two samples as the tip voxels 168, 170, or the end samples, and finds the geodesic 166 between these two samples.

In order to estimate the geodesic 166 based on the ridge function, the skeletonization module builds a pairwise dissimilarity graph that utilizes the ridge function, such that each edge in the graph has a weight inversely proportional to the pairwise average and proportional to the pairwise difference of the ridge function magnitude pairs. Edge weights are assigned by the skeletonization module as:

$$D(x, y) = \exp\left(\frac{-(R(x) + R(y))}{R(x) - R(y)}\right). \quad (1)$$

It should be understood, however, that the above equation is not the only possible approach, and that the centerline 166 and can be replaced with any other equation or approach that highlights the centerline 166 of the geobody 36. Once the skeletonization module estimates the piecewise dissimilarity matrix, the skeletonization module uses a shortest-path algorithm to find the set of voxels that connects these two end or tip voxels 168, 170 with the smallest overall edge strength. In one embodiment, the skeletonization module uses Dijkstra's algorithm for the path generation, although it should be understood that other approaches may be possible. FIG. 6B shows the estimated path 166 for the skeletonized volume 164 (e.g., geobody 36) shown in the raw image 160 shown in FIG. 6A.

Skeletonized representations of geobodies 36, allow geologists to overlay complex curvilinear systems on one another, as well as help geologists visually inspect and interpret seismic data. Additionally, by representing the seismic data as simple one-dimensional curves 166 that govern the inherited morphology, one can preserve the topology of the geobody 36 and perform simulations and complex structural analysis, as well as evaluate the system performance efficiently and accurately.

The EGKA system uses a ranking system that incorporates a trained decision mechanism and user preference to validate the geobodies 36 generated at each iteration of the EGKA system. The EGKA system considers the discriminative features (e.g., length of the skeleton) and the decision features (e.g., classifier confidence and detection overlap with the training samples) to build a retrieval list for ranking. The retrieval list enables the EGKA system to scan the relevant geobodies 36 detected from the seismic data in a recursive fashion and control the decision mechanism interactively to retrain the classifiers in the EGKA system to increase the decision performance.

Before ranking the geobodies 36, the EGKA system throws out any volumes that were in the training set that have already been provided to the user during the training phase. Additionally, geobodies 36 determined to have too short or too long length are thrown out in order to prevent outliers due to noisy observations or artifacts. Objects determined to be too short are likely due to noise in the data. Objects determined to be too long, on the other hand, may have been created by merging multiple objects. However, because the classification algorithm was trained iteratively, objects determined to be too long are unlikely to decompose into meaningful objects in the subsequent iterations. The EGKA system sorts the remaining objects based on classifier confidence and retrieves objects based on descending importance values.

The objects are then presented to the user via the IGTEV for validation. After each validation by the user, the EGKA system retrains the classification algorithm with the additional detected geobodies 36 in order to increase the retrieval performance. The EGKA system continues to make iterations until no sufficiently large geobodies are returned that do not overlap with the continuously updated training set.

Figure 7:
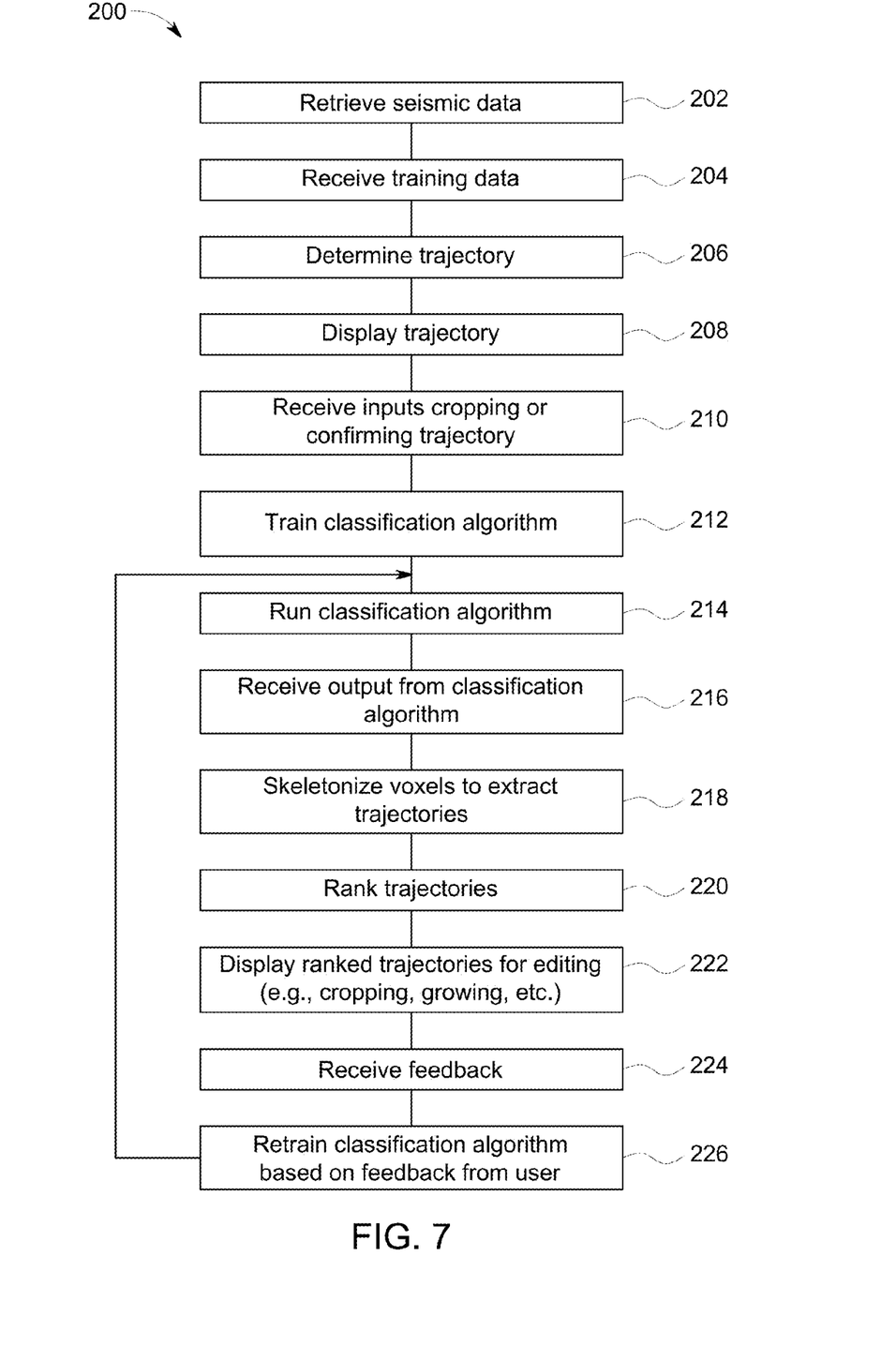
FIG. 7 is a flow chart of a process for using the expert guided knowledge acquisition (EGKA) tool to analyze a seismic data set in accordance with aspects of the present disclosure.
Figure 8A:
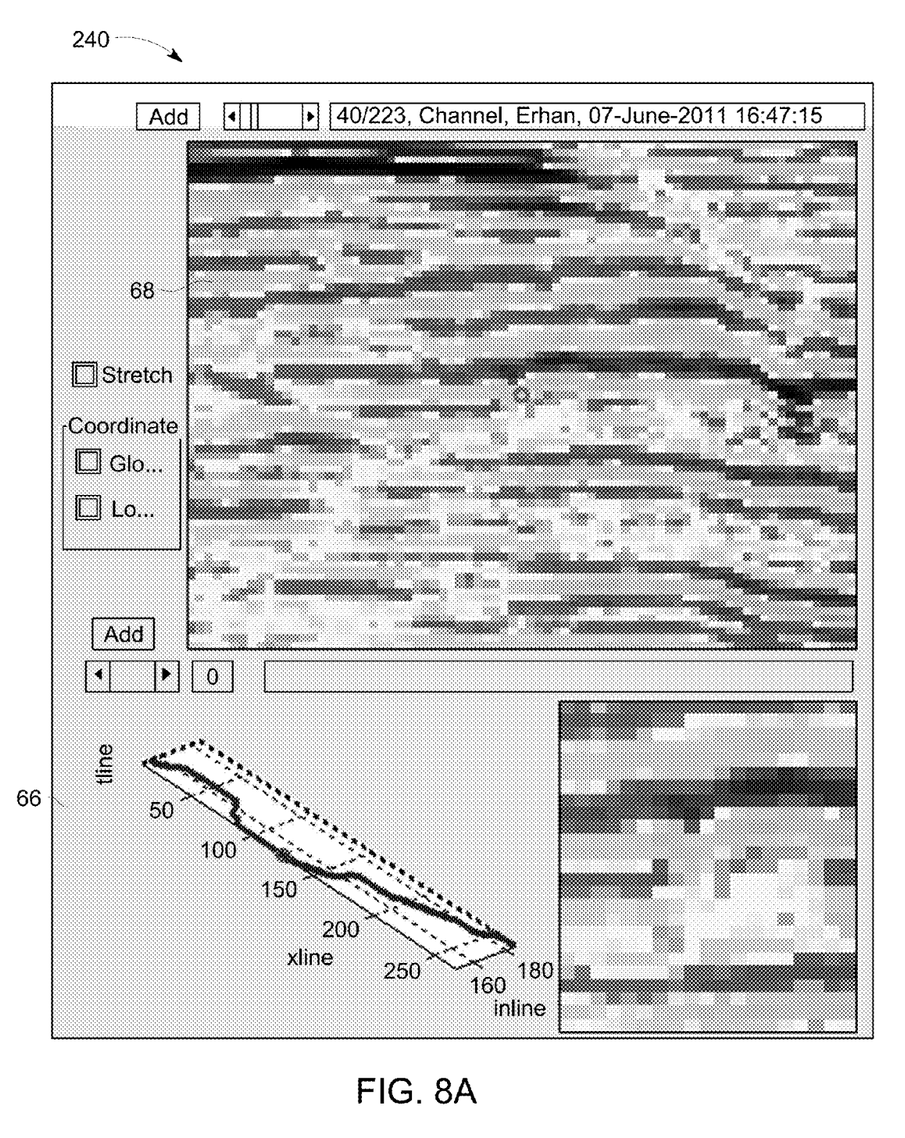
FIG. 8A shows an example of a highly-ranked channel found by the EGKA system in accordance with aspects of the present disclosure.
Figure 8B:
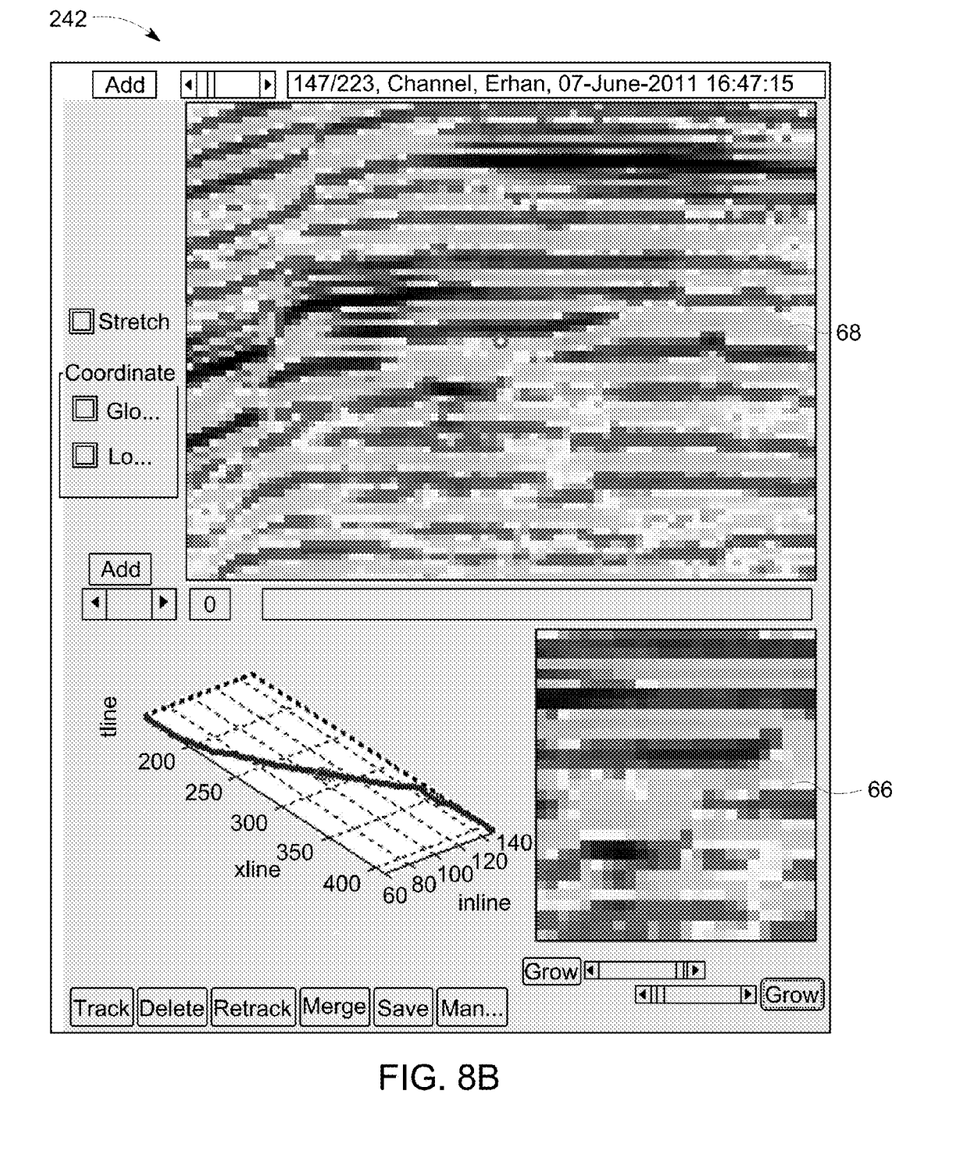
FIG. 8B shows an example of a highly-ranked channel found by the EGKA system in accordance with aspects of the present disclosure.
Figure 8C:
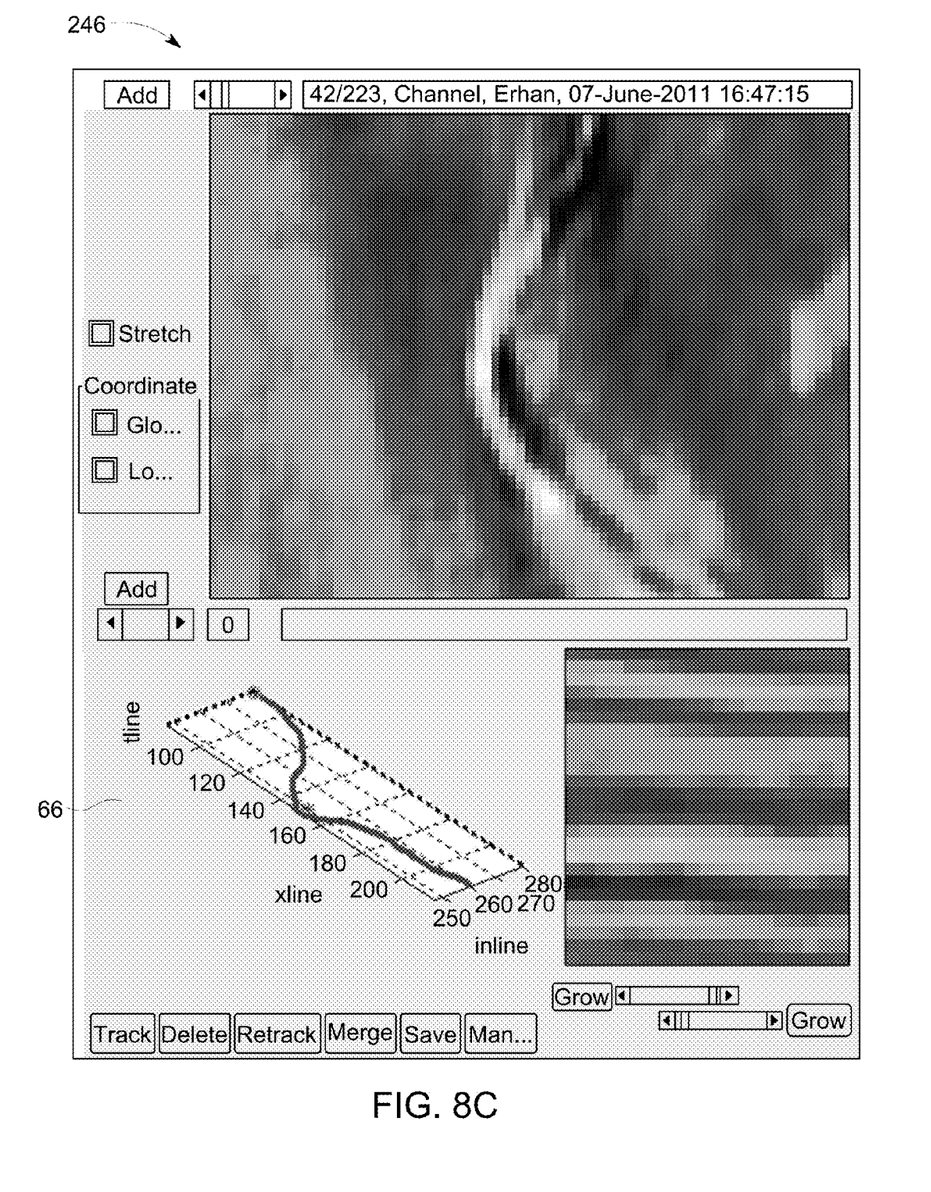
FIG. 8C shows an example of a highly-ranked channel found by the EGKA system in accordance with aspects of the present disclosure.
Figure 8D:
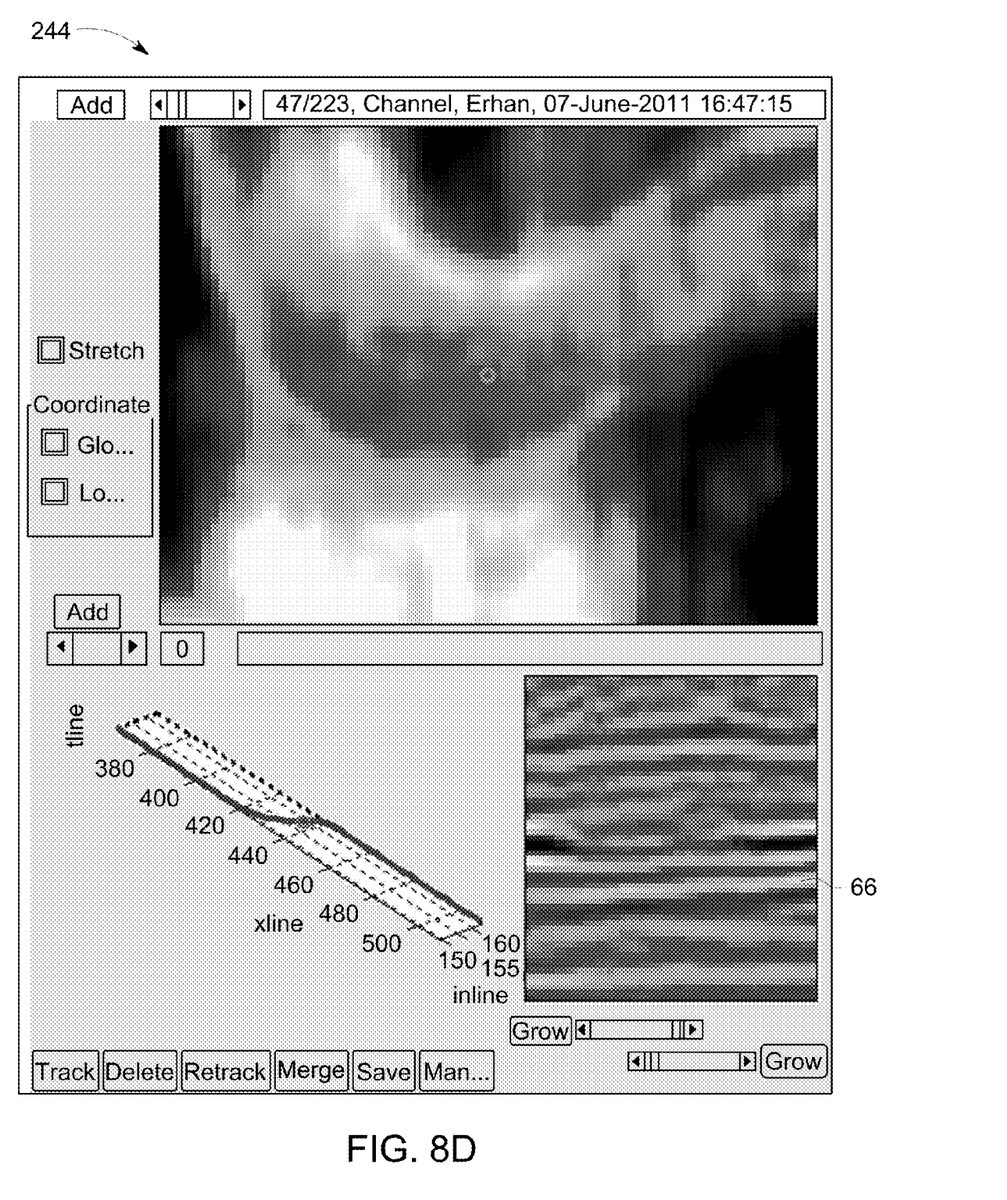
FIG. 8D shows an example of a highly-ranked channel found by the EGKA system in accordance with aspects of the present disclosure.

FIG. 7 is a flow chart of a process 200 for using the EGKA to analyze a seismic data set. In block 202, the process 200 retrieves the seismic data. The seismic data may be retrieved from the memory 30, or from some other source.

In block 204, the process 200 receives training data. For example, a user may use the IGTEV to identify two points, a seed point and a direction, or a trajectory of multiple identified geobodies 36 as was discussed with regard to FIG. 3.

In block 206, the process 200 may determine the trajectory from the received training data. The EGKA may extract a trajectory using the identified seed points. The trajectory is then displayed in block 208. In block 210, the process 200 may receive inputs cropping the trajectory, expanding the trajectory, confirming the trajectory, or some combination thereof. Additionally, in some embodiments, the user may input the geobody type 92, or other geobody characteristics 94, as was discussed with regard to FIG. 4.

In block 212, the process 200 trains the classification algorithm based upon the training data and the inputs received. As the process 200 analyzes seismic data, the classification algorithm may be iteratively trained.

In block 208, the process 200 partitions the seismic data. For example, the seismic data may be broken up into a large group of small blocks.

In block 214, the process runs the classification algorithm on the seismic data. In some embodiments, the seismic data may be partitioned by breaking it up into a large group of smaller blocks. Having been trained using training data received from the user, the classification algorithm goes through the various partitions of the seismic data and identifies possible geobodies in the seismic data that has not yet been examined by the user in the same seismic volume.

In block 216, the process receives an output from the classification algorithm. The output may include one or more sets of voxels. In block 218, the process 200 runs the skeletonization module on the voxels output from the classification algorithm. For example, the skeletonization module may extract trajectories for the possible geobodies identified by the classification algorithm. As discussed with regard to FIGS. 6A and 6B, for example, the skeletonization module may identify a ridge function running through the center of the volume, as well as the skeletonized volume.

In block 220, the process ranks the trajectories. As previously discussed, the process 200 may throw out the training data, as well as any trajectories that are too long or too short, and then ranks the remaining trajectories based on classifier confidence. In block 222, the process 200 retrieves trajectories based on descending importance values (e.g., classifier confidence) and displays them. The trajectories may be presented to the user via the IGTEV, or some other user interface for trajectory editing such as cropping, growing or re-initializing from new seed points and search directions.

In block 224, the process 200 receives feedback regarding the displayed trajectories. For example, the user may validate or confirm when the process 200 returns a trajectory that appears to correspond to a geobody. Alternatively, when the process presents the user with a trajectory that is determined by the user to not be related to a geobody of interest, the user may provide negative feedback. Based on each response from the user, the process further train or retrain (block 226) the classification algorithm. The process 200 may continue until the process fails to return a trajectory that has not yet been seen by the user.

FIGS. 8A-8D show four examples of highly-ranked channels 240, 242, 244, 246 found by the classification algorithm of the EGKA system when run on a sample seismic data set. These examples were not in the training set. The disclosed techniques were used to find channel configurations in a 3D seismic volume having 751×1001×1375 voxels. Using the IGTEV, a user tracked 29 channels and 33 simple parallel regions. These geobodies were used to train the classification algorithm to find similar objects in the same seismic data set. The full volume was divided into partitions and classified using the training data received during the training phase. Of the 852 total windows, 382 were classified as channels, and 470 are classified as simple parallel. From the windows classified as channels, 223 connected subvolumes were identified, from which the skeletonization module extracted trajectories. The trajectories were then ranked based on the confidence of the classifier. The most confident results were presented to the user first, allowing the user to work through the seismic data set quickly. Because the trajectories are ranked in order of confidence, the user need not review all the 223 trajectories to make an iteration. For example, the user may only review and validate 20-30% of the trajectories. However, if desired, the user may review all of the trajectories in order to reduce false negatives. Iterations may be stopped when system stops generating highly ranked new information.

Technical effects of the invention include using machine learning techniques to allow a user to quickly analyze a seismic data set. For example, a user may identify a number of geobodies in a data set in order to train an algorithm. The algorithm may then parse the remainder of the seismic data set in search for geobodies. The algorithm may rank possible geobodies and present the possible geobodies to the user in order of rank. Feedback from the user may be used to iteratively train the algorithm. The disclosed techniques may be used by a use (e.g., a geologist) to analyze a seismic data set without having to parse the entire data set. The disclosed techniques may lead to seismic data analysis that is faster, more thorough, and more efficient. In the disclosed techniques, because the same volume is used for both training and classification, the disclosed techniques may use a smaller number of seismic volumes that are annotated for training. Furthermore, geological variation across datasets that may introduce bias in the classifiers is reduced or eliminated. This may allow a geologist to analyze seismic data sets more consistently, faster, and for a lower cost.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   retrieving a seismic data set;
   receiving training data that comprises one or more seed points of an identified geobody within the seismic data set;
   determining a geobody trajectory of the identified geobody, based on the one or more seed points of the identified geobody;
   displaying the geobody trajectory;
   receiving inputs expanding the geobody trajectory, shrinking the geobody trajectory, confirming the geobody trajectory, or a combination thereof;
   training a classification algorithm using the geobody trajectory;
   running the classification algorithm on the seismic data set;
   receiving an output of one or more sets of voxels, representative of one or more possible geobodies, from the classification algorithm;
   skeletonizing the one or more sets of voxels to present the one or more sets of voxels as a set of possible geobody trajectories;
   receiving feedback regarding the one or more sets of voxels;
   retraining the classification algorithm based on the feedback; and
   outputting a list of the one or more possible geobodies.

2. The method of claim 1, wherein the training data comprises two seed points of a geobody trajectory, or a seed point and a direction of the identified geobody.

3. The method of claim 1, wherein the training data comprises a geobody category, a geobody characteristic, or both.

4. The method of claim 1, comprising:
   ranking the one or more possible geobody trajectories; and
   displaying the one or more possible geobody trajectories in order of rank.

5. The method of claim 4, wherein the one or more possible geobody trajectories are ranked by confidence.

6. The method of claim 1, wherein skeletonizing the one or more sets of voxels comprises determining a curve through the center of a volume of the possible geobody.

7. The method of claim 6, wherein the curve through the center of the volume is based on a ridge function.

8. The method of claim 1, wherein data is displayed via a user interface, which comprises:
   a 3D seismic data viewer;
   a seed point search and direction initiator; and
   a trajectory flythrough viewer.

9. The method of claim 1, comprising re-running the retrained classification algorithm on the seismic data set.

10. The method of claim 1, wherein the feedback received comprises inputs expanding one or more of the possible geobody trajectories, shrinking one or more of the possible geobody trajectories, confirming the possible geobody trajectories, rejecting the possible geobody trajectories, or a combination thereof.

11. The method of claim 1, wherein the feedback received comprises a validation or a rejection of one or more of the one or more possible geobody trajectories.

12. A seismic data analysis system comprising:
    a processor; and
    a display configured to display graphical representations of a seismic data set; wherein the seismic data analysis system is configured to:
       receive training data that comprises one or more seed points of an identified geobody within the seismic data set;
       determine a trajectory of the identified geobody;
       display the trajectory;
       receive inputs expanding the trajectory, shrinking the trajectory, confirming the trajectory, or a combination thereof;
       train a classification algorithm based upon the trajectory;
       run the classification algorithm on the seismic data set to identify one or more possible geobody trajectories within the seismic data set;
       display the one or more possible geobody trajectories;

receive feedback regarding the one or more sets of voxels;

retrain the classification algorithm based on feedback received; and output a list of the one or more possible geobodies.

13. The seismic data analysis system of claim 12, wherein the display comprises a user interface comprising:

a 3D seismic data viewer;

a seed point search and direction initiator; and a trajectory flythrough viewer.

14. The seismic data analysis system of claim 13, wherein the 3D seismic data viewer is configured to display a graphical representation of a region of the seismic data along an n-line, an x-line, a t-line, or some combination thereof.

15. The seismic data analysis system of claim 13, wherein the seed point search and direction initiator is configured to display cross sections passing through a seed point at a plurality of angles, enabling selection of a search direction for one of the one or more seed points.

16. The seismic data analysis system of claim 13, wherein the trajectory flythrough viewer displays a curve through a volume of a geobody based on one of the one or more seed points and a direction or based on two of the seed points, and wherein the trajectory flythrough viewer is configured to allow the user to crop or grow the curve through the volume.

17. A non-transitory computer readable medium comprising executable instructions that when executed cause a processor to:

retrieve a seismic data set;

receive training data that comprises one or more seed points of an identified geobody within the seismic data set;

determine a trajectory of the identified geobody;

display the trajectory;

receive inputs expanding the trajectory, shrinking the trajectory, confirming the trajectory, or a combination thereof;

train a classification algorithm based upon the trajectory;

run the classification algorithm on the seismic data set to identify one or more possible geobodies within the seismic data set;

skeletonize the one or more possible geobodies to extract one or more possible geobody trajectories;

rank the one or more possible geobody trajectories based on confidence;

display the one or more possible geobody trajectories in order of rank;

receive feedback regarding the one or more possible geobody trajectories; retrain the classification algorithm based on feedback received; and output a list of the one or more possible geobodies.

18. The non-transitory computer readable medium of claim 17, wherein the training data comprises two seed points of the identified geobody, or one seed point and a direction of the identified geobody.

19. The non-transitory computer readable medium of claim 17, wherein skeletonizing the one or more possible geobodies comprises determining a curve through the center of a volume of the possible geobody based on a ridge function.

20. The non-transitory computer readable medium of claim 17, wherein the feedback received comprises a confirmation of, a rejection of, or an edit to the one or more possible geobodies displayed.

* * * * *